United States Patent [19]
Yeung

[11] Patent Number: 4,767,164
[45] Date of Patent: Aug. 30, 1988

[54] FIBER OPTIC ROTATION RATE ENCODER

[75] Inventor: Peter C. Yeung, Glendale, Calif.

[73] Assignee: Crane Co., New York, N.Y.

[21] Appl. No.: 16,463

[22] Filed: Feb. 18, 1987

Related U.S. Application Data

[63] Continuation of Ser. No. 903,821, Sep. 2, 1986, abandoned, which is a continuation of Ser. No. 785,768, Oct. 9, 1985, abandoned.

[51] Int. Cl.⁴ .................. B60T 8/32; G01D 5/34; H01J 40/14
[52] U.S. Cl. ................. 303/91; 188/181 R; 250/231 SE; 250/227; 324/17 S; 303/92
[58] Field of Search ............ 303/91, 95, 92, 100; 188/181 R, 181 A; 324/17 S; 250/231 SE, 227, 237 G; 340/347 P; 356/73.1

[56] References Cited

U.S. PATENT DOCUMENTS

| | | | |
|---|---|---|---|
| 3,454,777 | 7/1969 | Marcus | 250/237 R |
| 3,466,097 | 9/1969 | Flook, Jr. | 303/91 |
| 3,559,065 | 1/1971 | Grundy | 324/17 S |
| 3,622,973 | 11/1971 | Domann | 340/52 R |
| 3,629,590 | 12/1971 | Case | 250/208 |
| 3,698,772 | 10/1972 | Nixon | 303/97 |
| 3,719,886 | 3/1973 | Vanderberg et al. | 324/167 |
| 3,742,486 | 6/1973 | Skidmore | 340/347 P |
| 3,779,612 | 12/1973 | Tschannen | 303/97 |
| 3,831,169 | 8/1974 | Raser | 250/233 |
| 3,856,365 | 12/1974 | Steigerwald et al. | 303/20 |
| 3,886,354 | 5/1975 | Swiden et al. | 250/233 |
| 3,954,339 | 5/1976 | Atwood | 356/152 |
| 3,960,410 | 6/1976 | Leitz et al. | 303/100 |
| 3,999,074 | 12/1976 | Callaghan | 250/551 |
| 4,071,753 | 1/1978 | Fulenwider et al. | 250/227 |
| 4,091,280 | 5/1978 | Ellis et al. | 250/231 R |
| 4,109,234 | 8/1978 | Davis | 303/92 |
| 4,182,953 | 1/1980 | Hurley, III et al. | 250/231 SE |
| 4,243,940 | 1/1981 | Ruof | 303/93 |
| 4,430,566 | 2/1984 | Searle | 250/231 SE |
| 4,581,530 | 4/1986 | Brogardh et al. | 250/231 SE |

FOREIGN PATENT DOCUMENTS

| | | |
|---|---|---|
| 3147526 | 7/1982 | Fed. Rep. of Germany . |
| 2343254 | 9/1977 | France . |
| WO84/04972 | 12/1984 | Worl Int. Prop. O. . |
| 2155619 | 8/1985 | United Kingdom . |

OTHER PUBLICATIONS

J. Ermisch, "Circuitry Engineering of a Contactless Turning-rate Pulse Generator Independent of Outside Light" Electrie, vol. 33, No. 4 (1979), pp. 208–210.
D. Howell, "Digital Speedometer uses Fiber Optics", Electronic Products Magazine, Jul. 1976, p. 14.

*Primary Examiner*—John W. Caldwell, Sr.
*Assistant Examiner*—Alvin Oberley
*Attorney, Agent, or Firm*—Willian Brinks Olds Hofer Gilson & Lione Ltd.

[57] ABSTRACT

A reflective optical wheel speed transducer system is disclosed. The system utilizes a single optical fiber to transmit light to a pair of interrupter discs, and to collect light reflected from the discs. One of the interrupter discs is stationary, and one is rotated at an angular velocity proportional to the rotational speed of a wheel. Both discs are provided with alternating, regularly spaced reflecting and transmissible areas. The reflecting areas of the stationary disc reflect a constant bias level of light to the optical fiber. The reflecting areas of the rotatable disc modulate light passing through the transmissible areas of the stationary disc at a rate proportional to the angular velocity of the wheel. Thus, the interrupter discs generate a modulated light signal that rides on top of the fixed bias signal. Decoding circuitry is provided to convert the modulated component of the light signal to an electrical signal that represents the rotational speed of the wheel. Circuitry is also provided to detect the absence of the fixed bias component of the light signal to monitor the continuity and integrity of the system. A graded index lens is provided at the optical fiber interface and an integral lens/optical fiber connector assembly is provided to minimize light losses in the system.

23 Claims, 3 Drawing Sheets

FIBER OPTIC ROTATION RATE ENCODER

This application is a continuation of application Ser. No. 903,821, filed Sept. 2, 1986, now abandoned. which is a continuation of application Ser. No. 785,768, filed Oct. 9, 1985, now abandoned.

BACKGROUND OF THE INVENTION

The present invention generally relates to an optical transducer system for measuring the rotational speed of a wheel. The present invention specifically relates to a double interrupter disc, single optical fiber, reflective wheel speed transducer system.

The prior art includes several different types of optical transducers for measuring the rotational speed of a rotating object. Most of these transducers are transmissive systems, that is, the light source and light receiver are placed on opposite sides of a rotating interrupter disc. The interrupter disc modulates the light transmitted from the source towards the receiver at a rate proportional to the angular velocity of the rotating interrupter. The rate of light modulation can then be decoded to produce an electrical signal proportional to the angular velocity of the interrupter, or an external wheel which drives the interrupter. U.S. Pat. No. 3,559,065 (Grundy) discloses one such transmissive optical transducer.

U.S. Pat. No. 3,698,772 (Nixon) discloses a reflective optical transducer system. Nixon provides a reflective interrupter disc, which is driven at an angular velocity that is a function of the rotational speed of a wheel. The disc carries a series of light absorbing, radial markings. A light source is located adjacent the disc to reflect light toward the input of a photocell. As the disc rotates, the level of light reflected from the disc varies to provide a variable output signal from the photocell. Electrical decoding circuitry converts the variable output signal into a wheel speed signal.

Both the Grundy transmissive system and the Nixon reflective system have several drawbacks. First, neither system uses fiber optics. Optical fibers would allow the electrical elements of the light source and decoding circuitry to be remotely located from the interrupter disc. The interrupter disc is usually located in an electrically noisy environment. Thus, fiber optics can provide a means for isolating electrical components from an electrically noisy environment.

Second, if either Grundy or Nixon were provided with fiber optics, each system would require at least two optical fibers—one from the light source to the interrupter, and one from the photocell to the decoding circuitry. Optical fibers on both sides of the interrupter can create transducer design problems. Space constraints in a transducer often require the electrical light source circuitry and decoding circuitry to be located in the same vicinity. If one optical fiber leads directly from the light source to the interrupter, the other fiber must travel back around the interrupter, without interfering with it, to the decoding circuitry. This requirement complicates the transducer design.

Third, Nixon does not disclose a means for indicating circuit failure and for monitoring system integrity. If Nixon's light source failed, for example, extraneous light in the interrupter area could still produce wheel speed signals. Grundy discloses a means for indicating circuit failure and for monitoring system integrity, but Grundy requires a pulsating light source. A carrier detector is provided at the photocell output to detect the light pulse frequency. The absence of the pulse frequency indicates some malfunction in the transducer. While Grundy's system will detect circuit failures, it complicates the system by requiring light pulse generation and detection circuitry.

Fourth, both Grundy and Nixon use only one interrupter disc. In a single disc system, the light modulation signal is basically attained by counting lines. As a result, the line spacing must be similar to the diameter of the light beam. This has the effect of limiting the measurement resolution of rotation frequency.

SUMMARY OF THE INVENTION

The present invention is directed to a novel reflective optical transducer system that overcomes many of the shortcomings of prior art transducers.

According to this invention, a rotatable interrupter is turned at a rate that is a function of the angular velocity of a wheel. A stationary interrupter is spaced from and adjacent to the rotatable interrupter. Both interrupters have alternating light reflective and nonreflective areas around their peripheries. A fiber optic transmits light from a light source to the stationary interrupter. The fiber optic also receives light that is reflected by the interrupters. The reflective areas of the stationary interrupter will reflect a bias level of light, independent of the rotatable interrupter. The rotatable interrupter will reflect light back to the fiber optic when its reflective areas overlap with the transmissible areas of the stationary interrupter. Thus, the amount of light received by the fiber optic will modulate above the bias level, at a rate that is proportional to the angular velocity of the wheel, when the rotatable interrupter is turned. Circuitry is provided to convert the modulated light rate to an electrical signal proportional to the rotational speed of the wheel.

The present invention preferably uses only one optical fiber. Thus, an object of the invention is to locate the electrical components of the light source and decoding circuitry remote from the interrupter discs, and to overcome the design problems associated with having optical fibers on opposite sides of the interrupter.

Further, the transducer of the present invention can be provided with a circuitry for detecting the absence of the bias level of light. This absence corresponds to a failure in the fiber optic and/or the stationary interrupter. Thus, another object of the invention is to provide a straightforward approach to detect system failures and to monitor system integrity.

Still further, the invention uses two interrupter discs to improve resolution, thereby providing a more accurate wheel speed measurement. Moreover, the present invention overcomes the scattering and light loss problems inherent in a two disc, single fiber system.

The invention itself, together with further objects and attendant advantages, will best be understood by reference to the following detailed description taken in conjunction with the drawings.

DETAILED DESCRIPTION OF A PREFERRED EMBODIMENT

Figure 1:
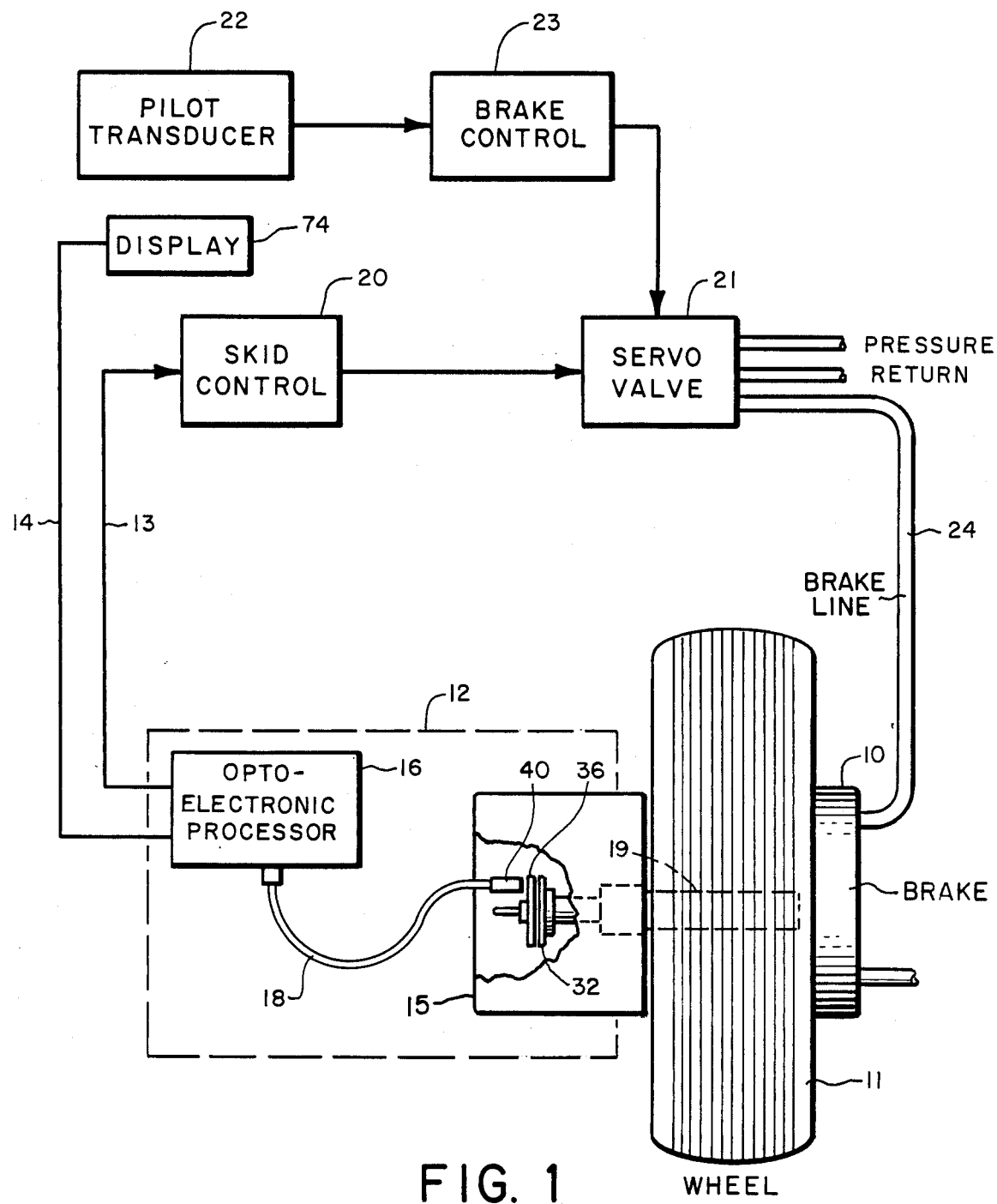
FIG. 1 is a schematic diagram of an aircraft antiskid brake system that includes an optical wheel speed transducer system embodying the present invention.

Referring now to the drawings, a preferred embodiment of the present invention will be described. FIG. 1 shows the major components of an aircraft antiskid braking system which provides control for the brake 10 of a rotatable wheel 11. The brake 10 is controlled by the servo valve 21 via brake line 24. The servo valve is responsive to braking commands supplied by the pilot, via pilot transducer 22 and brake control 23, to skid control 20. The skid control 20 receives a wheel speed signal on line 13 from an optical wheel speed transducer system 12 to control the servo valve 21 to prevent the wheel 11 from skidding. Examples of servo valves 21 that may be used in the present invention can be found in U.S. Pat. No. 4,053,187 (Cook) or commonly owned, pending U.S. Pat. application, Ser. No. 723,044, filed Apr. 15, 1985 U.S. Pat. No. 4,668,021. This patent and patent application are incorporated by reference herein for their disclosures relating to such servo valves.

The wheel speed signal used by skid control 20 is generated by the optical wheel speed transducer system 12. As shown generally in FIG. 1, the transducer system 12 includes an optical wheel speed transducer 15 and an optoelectronic processor 16. An optical fiber 18 allows the optoelectronic processor 16 and its electrical components to be remotely located from the transducer 15. The single optical fiber 18 transmits light signals between the transducer 15 and processor 16. The wheel speed transducer 15 includes a rotatable interrupter disc 32 which is turned by a shaft 19 which is driven by the wheel 11. A stationary interrupter disc 36 is located adjacent to and coaxial with the rotatable disc 32. A collimating lens 40 is attached to the end of the optical fiber adjacent to the stationary disc 36. This collimating lens enhances the transmission of light onto the discs 32, 36 and the collection of light reflected from the discs. The components of the optoelectronic wheel speed transducer 15 generate light signals that are proportional to the rotational speed of the wheel 11. These light signals are transmitted to the optical processor 16 via fiber optic 18. The optoelectronic processor then converts the optical wheel speed signal to an electrical wheel speed signal and an electrical continuity signal. The wheel speed signal is sent on line 13 to the skid control 20 where it is used to compute a skid control signal for the servo valve 21. The continuity signal can be sent on line 14 to a display in the cockpit to visually indicate the continuity or discontinuity of the system.

Figure 2:
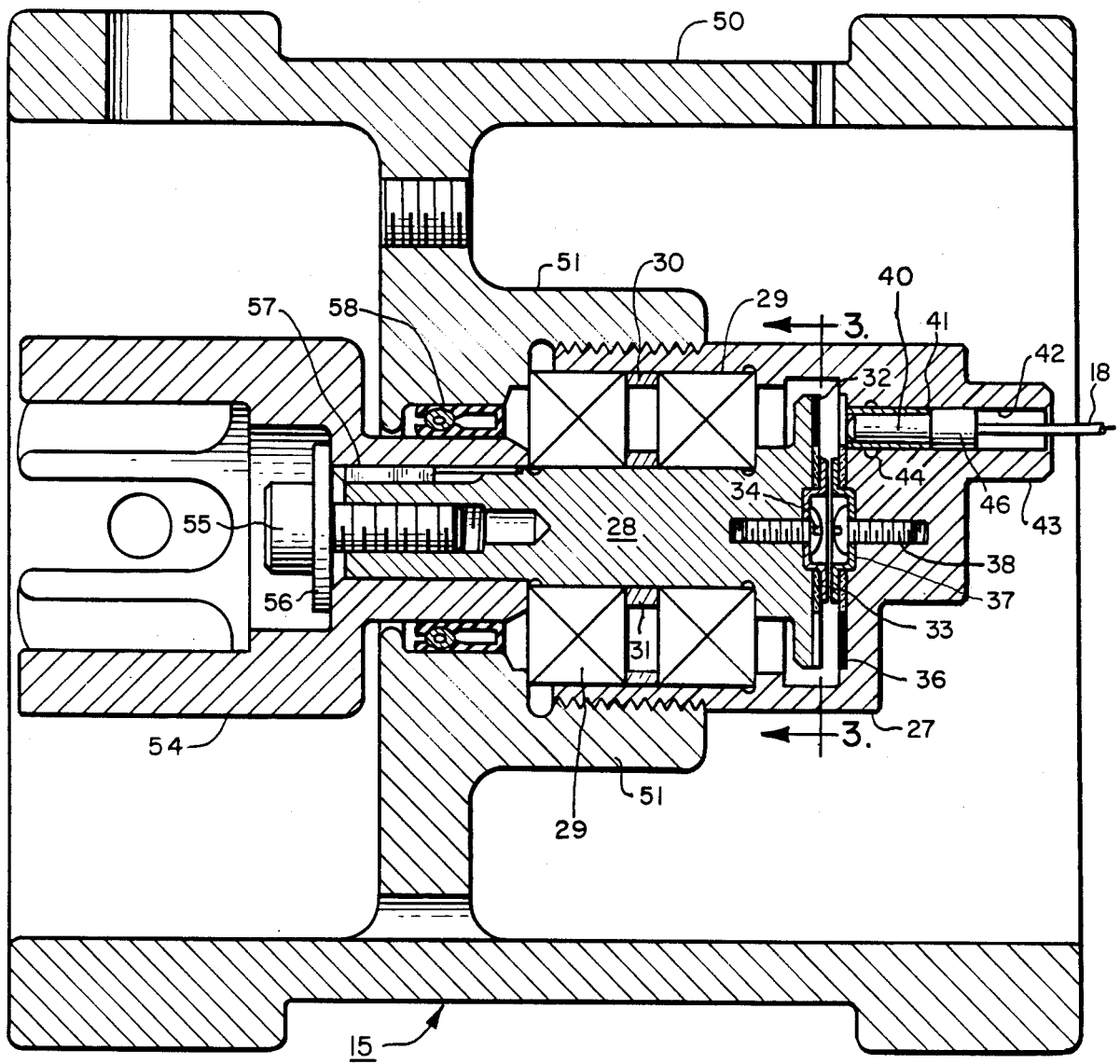
FIG. 2 is a sectional view of an optical wheel speed transducer of the preferred embodiment of the present invention.

Referring now to FIG. 2, the construction of an optical wheel speed transducer 15 embodying the present invention will now be described in greater detail. The transducer body 27 houses the rotor 28, which is supported by a pair of ball bearings 29. Two spacers 30 and 31 separate the ball bearings. A rotatable incremental disc 32 is mounted perpendicularly on the rotor 18 with a retainer 33 and screw 34. An identical stationary incremental disc 36 is mounted perpendicularly on the transducer body 27 with a similar retainer 37 and screw 38. The stationary disc 36 is spaced adjacent to and coaxial with the rotatable disc 32.

Figure 3:
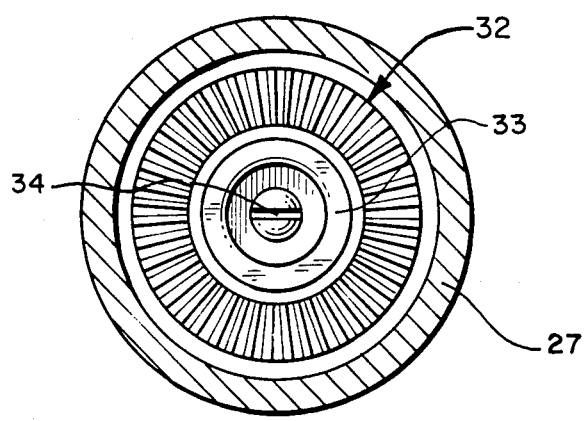
FIG. 3 is a sectional view taken along lines 3—3 of FIG. 2.

As shown in FIG. 3, the incremental discs 32 or 36 can be transparent glass substrates with an reflective metal line pattern deposited on one side. The line pattern is preferably configured so that each disc contains an identical pattern of alternating reflective and light transmissible areas around its periphery. The reflective and transmissible areas should be of equal size, so that they are regularly spaced around the disc periphery. The number of reflective and transmissible areas on each disc is a matter of choice. With more areas per disc, greater sampling frequency and resolution is achieved.

A graded index (GRIN) lens 40 is mounted in a precision holder 41, which is positioned at the end of a channel 42 of the transducer connector receptacle 43. One end of the lens 40 should be adjacent and perpendicular to the stationary disc 36. The lens holder 41 fits snuggly within the receptacle channel 42, and is affixed in place by epoxy in a groove 44 on the surface of the channel 42. The epoxy, together with the tightfit ball bearings 29, provide an effective seal of the transducer cavity from the outside environment.

The purpose of the GRIN lens 40 is to collimate light that is transmitted to and received from the discs 32, 36. The collimation of the light optimizes the amount of light incident on and collected from the discs, thereby minimizing light losses at the interrupter discs 32 and 36. The present invention uses the GRIN lens, which projects light over several reflective line spacings of each disc, of the two disc interrupter. (As explained above, the light incident on a single disc interrupter must not be greater than the area of a non-transmissible area.) In the present embodiment of the invention, a SELFOC-type graded index lens 40 is used. The SELFOC lens is manufactured by Nippon Sheet Glass (NSG), America, Inc., Somerset, N.J.

A standard optical fiber connector 46 should fit tightly within the receptacle channel 42. The connector 46 is fully inserted in the channel 42, so that the end face of the connector 46 and, thus, the optical fiber, are nearly in contact with the GRIN lens 40. In this configuration, the optical fiber should be concentric along the optical axis of the GRIN lens 40. The integral assembly of a GRIN lens 40 and optical fiber connector 46 in a connector receptacle 43 allows precise alignment of the optical fiber 18 with the focal point of the lens 40. This arrangement is important to ensure the efficient and repeatable coupling of light to and from the optical fiber 18.

Any standard optical fiber connector 46, such as an SMA-type connector, can be used in the present embodiment of the invention. It is only important that the connector fit tightly within the receptacle channel 42, so that the fiber optic 18 is precisely aligned with the focal center of the lens 40. The advantage of this approach, as opposed to using a conventional fiber optic which is already integral with a lens, is that any standard fiber optic connector can easily locate an optical fiber in the proper position in the transducer receptacle, that is, at the exact focal center of the GRIN lens.

For ease of mounting, the transducer body 27 is threaded into a cup 51 of a nonrotating adaptor 50. A drive coupler 54 is fastened to the shaft of the rotor 28 with a screw 55 and washer 56. The drive coupler 54 is indexed with a key insert 57. A spring-loaded shaft seal 58 is used at the junction of the drive coupler 54 and the cup 51 of the transducer adaptor 50 to provide an additional seal to the transducer body 27. The whole assembly 15 shown in FIG. 2 represents a sturdy, yet simple and lightweight, alternative to conventional optical encoders.

Figure 4:
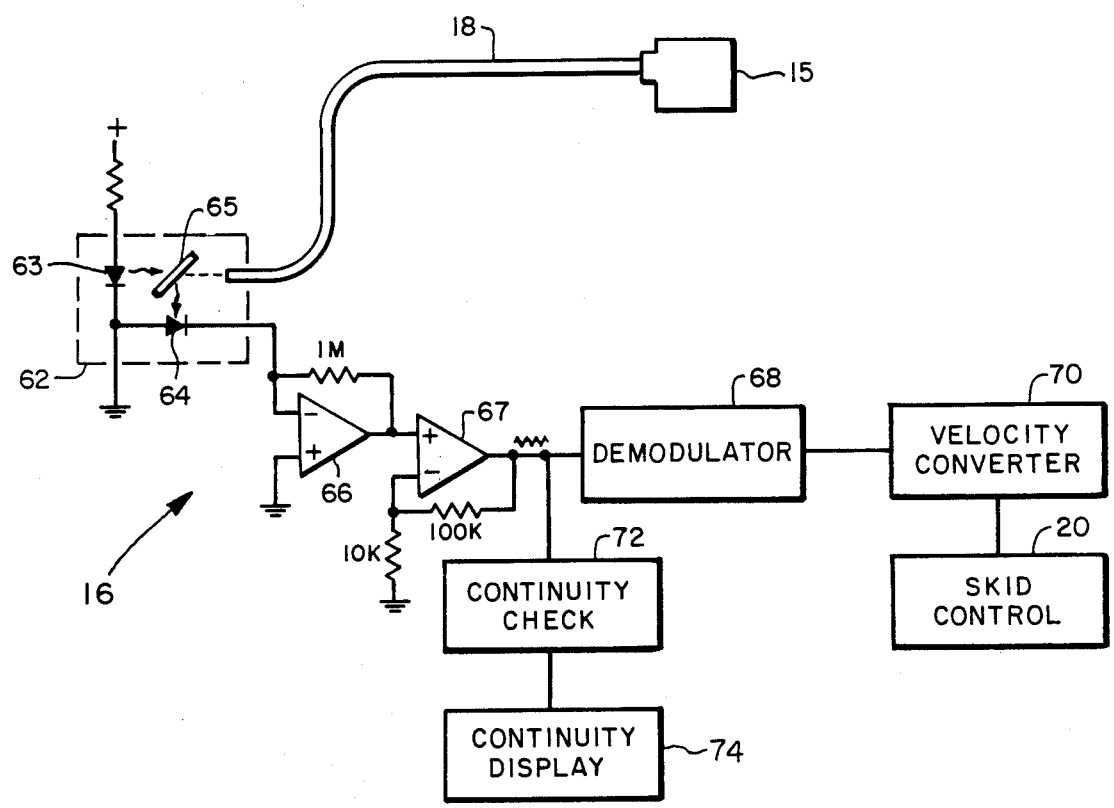
FIG. 4 is a schematic and circuit diagram of the optical wheel speed transducer system of the preferred embodiment of the present invention.

FIG. 4 shows the components of the optoelectronic processor 16, together with the wheel speed transducer 15 and optical fiber 18. A set of bidirectional optoelectronic components 62 is necessary at the point of monitoring to inject light into transducer 15, and couple light out of the transducer 15 for processing, through the single optical fiber 18. Several known approaches can be used to configure the bidirectional optoelectronic module 62. For example, as shown in FIG. 4, a light emitting diode (LED) 63 and a photodetector 64 can be used with beam splitting optics 65 or optical fiber directional couplers. In a present embodiment of the invention, the optoelectronics are a bidirectional module with micro-optics such as ABP-50, manufactured by ADC Fiber Optics.

The LED 63 serves as the light source to the transducer. Preferably, an infrared LED is used. The LED can be operated in either the continuous mode or pulsed mode. The former has the advantage of simple design and construction. The latter has the advantage of providing a carrier signal that can be used for discriminating extraneous light from external sources.

The photodetector 64 receives light signals collected from the interrupter discs 32, 36 through the optical fiber 18, and converts them to electrical signals. The voltage of the electrical signals will be proportional to the intensity of the light signals. Conventional operational amplifiers 66 and 67 amplify the electrical output of the photodetector 64. The signal output from the photodetector 64 and amplifiers 66, 67 will be an amplitude modulated signal imposed on a fixed bias signal when the wheel 11 and transducer 15 are operating. The demodulator 68 demodulates amplitude modulated component of this signal to provide an electrical signal that is proportional to the wheel speed. This signal is then processed by a standard velocity converter 70 to provide an accurate wheel speed signal to the skid control 20. A continuity check circuit 72 is provided in parallel with the demodulator 68 to detect the presence or absence of the fixed bias component of the signal output from the photodetector. The continuity check circuit 72 can be designed to provide a continuity signal to a display 74 when the bias component is present, or a discontinuity signal to the display 74 when the bias component is absent.

The design and construction of the components of the optoelectronic processor 16 shown in block diagram form in FIG. 4 will be readily apparent to those skilled in the art. The details of the processor circuitry of a different type of optical wheel speed transducer system are disclosed in commonly owned, pending U.S. patent application No. 503,093, filed June 10, 1983. That patent application is incorporated by reference herein and made a part hereof for its disclosure of such circuitry.

The wheel speed transducer of the present invention, as embodied in FIGS. 1-4, operates in the following manner. The optical fiber 18 transmits light at a constant intensity, for example, from the LED 63. The GRIN lens 40 expands the diameter of the transmitted light, collimates it, and projects it on a section of the periphery of the stationary disc 36. Since the stationary disc 36 has alternating reflecting and transmissible areas of equal size, approximately one-half of the light directed to the stationary disc will always be reflected back into the collimating lens 40, independent of the relative orientation of the rotatable disc 32. The constant reflections from the stationary disc (and from various optical interfaces along the fiber optic link) provide a constant bias level light signal.

When the wheel 11 is rotating, it drives the rotor 28 via the drive coupler 54. The rotor then turns the rotatable interrupter disc 32 at a rate that is a function of the angular velocity of the wheel 11. As the rotatable disc 32 turns, its line pattern acts as a periodic shutter to light passing through the transmissible areas of the stationary disc 36. When the reflective areas of the rotatable disc 32 overlap with the transmissible areas of the stationary disc 36, additional light will be reflected back into the lens 40 along the same optical path. Thus, the shutter action of the rotatable and stationary discs modulates light reflected back to the lens 40 at a rate proportional to the rotational speed of the rotatable disc.

The GRIN lens 40 receives reflected light that comprises the constant bias reflections and the modulated reflections. The GRIN lens collects the light in a collimated beam, and then focuses it on the proximal end of the optical fiber 18. The optical fiber 18 then conveys this light signal to the photodetector 64 adjacent the remote end of the fiber.

Figure 5:
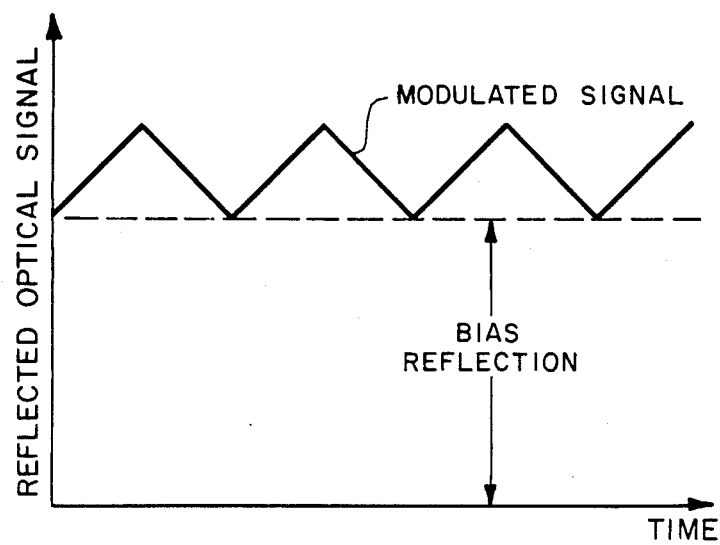
FIG. 5 is a graph that illustrates the bias level signal and modulated light signal produced by the preferred embodiment of the present invention.

When the optical wheel speed transducer system 12 is working properly, the light signal received by the photodetector 64 will comprise the modulated reflected light signal riding on top of a fixed bias due to the constant reflections signal from the stationary disc 36. This signal is shown graphically in FIG. 5. The photodetector 64 will produce an electrical signal having an amplitude proportional to the intensity of the light signal. This electrical signal is then amplified by the operational amplifiers 66 and 67. The signal output by the second operational amplifier 67 will comprise a modulated signal riding a fixed bias, as indicated in FIG. 5.

The demodulator 68 will decode the amplitude modulation frequency of this signal to generate a signal proportional to the rotational speed of the rotatable disc 32 and, thus, the wheel 11. (The frequency of the amplitude modulation will be proportional to the rotational speed of the disc and wheel.) This demodulated signal will then pass to the velocity converter 70, which will convert it to a signal that represents the true rotational speed of the wheel 11. The wheel speed signal can then be processed by other circuitry, such as the skid control 20, shown in FIGS. 1 and 4.

The continuity check circuit 72 will process the bias component of the signal output from the second operational amplifier 67. The presence of the bias signal indicates that the wheel speed transducer system 12 is working properly. The absence of the bias signal indicates that some element of the system, such as the LED 63 or optical fiber 18, is not functioning properly. Thus, monitoring the presence of the bias signal affords a means of verifying system integrity.

The continuity check circuit 72 can be set up to send various warning signals to a continuity display 74 near the equipment operator. For example, an alarm signal can be sent when the bias signal is absent to warn the operator that the wheel speed transducer system is not functioning properly. Alternatively, a status signal can be constantly generated when the bias signal is present to indicate that the wheel speed transducer system is operating correctly. It is even foreseeable that the continuity check circuit 72 could provide both types of alarm and status signals.

At least three significant advantages are achieved with the double interrupter disc, reflective optical wheel speed transducer system of the present invention. First, a single optical fiber can be used to both transmit light from a source and collect the returned light signal from the interrupter discs. Thus, the present invention eliminates all electrical parts from the transducer unit, and retains only a minimum number of optical components. This is an important consideration in wheel speed transducer design, since these transducers often operate in adverse environments. For example, in environments like aircraft antiskid systems, component size, weight and electrical noise are important concerns. The ability to only use one optical fiber cable allows greater latitude in designing a compact, durable, reliable, and accurate transducer unit.

Second, the constant reflections from the stationary interrupter disc provide a means to sense the continuity between the transducer unit and the point of monitoring. Moreover, this object can be achieved without a pulsed light source and its attendant generation and decoding circuitry.

Third, through the use of collimating GRIN lens, the present invention overcomes inherent light losses, which are a significant obstacle to constructing an accurate double interrupter disc, single optical fiber wheel speed transducer system. Two interrupter discs allow line spacings on the discs to be much smaller than the light beam, thereby providing a more compact transducer size, better resolution and more accurate wheel speed transducer signals. The interaction of the two discs, however, causes greater light losses, than a single interrupter disc system, when used with a single fiber optic light source and collector. Light transmitted from the end of a fiber optic will diffuse in all directions at an angle corresponding to the numerical aperture of the fiber end. (The lights assumes a conical form.) The fiber will collect light in the reverse fashion, that is, only light converging on the end of the fiber at the proper angle will be collected. Light losses will also occur at any other interface or discontinuity of the optical fiber. The resulting modulated light signal, after accounting for the sum of all light losses, could be so small that it is hard to differentiate from noise. The system then becomes unreliable.

The present invention overcomes these light loss problems by using the GRIN lens at the optical fiber/interrupter discs interface, and the integral assembly of the optical fiber connector with the GRIN lens in the transducer connector receptacle. The GRIN lens increase the quantity of light transmitted to and collected from the interrupter discs. Specifically, the GRIN lens expands the light emerged from the end of the optical fiber into a cylinder of collimated beam, and directs the beam perpendicular to the interrupters. The lens receives reflected light over a wider diameter than the end of the fiber, collimates the reflected light, and focuses it on the end of the fiber. The integral assembly of the GRIN lens with the fiber optic connector allows the end of the fiber to be precisely aligned with the focal point of the lens. This provides more efficient coupling of light between the optical fiber and the GRIN lens.

It should be understood that various changes and modifications to the preferred embodiment described above will be apparent to those skilled in the art. For example, the invention has been described above to determine the rotational speed of a vehicular wheel. The invention, however, can be adapted to measure the angular velocity of many types of rotating objects. Further, the preferred embodiment described above utilized only one optical fiber. The invention can be easily expanded to provide functional redundancy by having second and third optical fiber/GRIN lens combinations in additional connector receptacles situated adjacent to the existing one.

It is intended that the foregoing description be regarded as illustrative rather than limiting, and that it be understood that it is the following claims, including all equivalents, which are intended to define the scope of the invention.

I claim:

1. A reflective optical transducer system for measuring the rotational speed of a wheel comprising:
    rotatable interrupter means having alternating reflective and nonreflective areas around its periphery;
    means for turning the rotatable interrupter means at a rate that is a function of the angular velocity of the wheel;
    stationary interrupter means, spaced from and adjacent to the rotatable interrupter means, and having alternating reflective and light transmissible areas around its periphery;
    a light source located remotely from the rotatable and stationary interrupter means;
    an optical fiber for transmitting light from the light source to the stationary interrupter means, and for receiving light reflected by the rotatable and stationary interrupter means, wherein the reflective areas of the stationary interrupter means reflect a bias level of light, and the reflective areas of the rotatable interrupter means reflect light passing through the transmissible areas of the stationary interrupter means, so that, when the rotatable interrupter means is turned, the amount of light received by the optical fiber will be modulated above the bias level and at a rate proportional to the angular velocity of the wheel; and
    means, located remotely from the stationary and rotatable interrupter means, for converting the modulated light rate to an electrical signal proportional to the rotational speed of the wheel.

2. The invention of claim 1 further comprising means, located remotely from the rotatable and stationary interrupter means, for detecting the absence of the constant bias level of light.

3. The invention of claim 1 wherein only one optical fiber transmits light from the light source and receives reflected light from the rotatable and stationary interrupter means.

4. The invention of claim 1 further comprising a graded index collimating lens between the stationary interrupter means and the optical fiber, wherein the lens collimates the light transmitted by the optical fiber, and the light reflected by the rotatable and stationary interrupter means and received by the optical fiber.

5. A reflective optical transducer system for measuring the rotational speed of a wheel comprising:
    a rotatable disc having regularly spaced, alternating reflective and nonreflective areas around its periphery;
    means for turning the disc means at a rate that is a function of the angular velocity of the wheel;
    a stationary disc, spaced from and adjacent to the rotatable disc, and having regularly spaced, alternating reflective and light transmissible areas around its periphery;

a light source located remotely from the rotatable and stationary discs;

an optical fiber for transmitting light from the light source to the stationary disc, and for receiving light reflected by the rotatable and stationary discs, wherein the reflective areas of the stationary disc reflect a bias level of light, and the reflective areas of the rotatable disc reflect light passing through the transmissible areas of the stationary disc, so that, when the rotatable disc is turned, the amount of light received by the optical fiber will be modulated above the bias level and at a rate proportional to the angular velocity of the wheel;

means, located remotely from the stationary and rotatable discs, for converting the modulated light rate to an electrical signal proportional to the rotational speed of the wheel; and means, located remotely from the rotatable and stationary discs, for detecting the absence of the constant bias level of light.

6. The invention of claim 5 wherein only one optical fiber transmits light from the light source and receives reflected light from the rotatable and stationary discs.

7. The invention of claim 5 further comprising a graded index collimating lens between the stationary disc and the optical fiber, wherein the lens collimates the light transmitted by the optical fiber, and the light reflected by the rotatable and stationary discs and received by the optical fiber.

8. A reflective optical transducer system for measuring the rotational speed of a wheel in an aircraft skid control system comprising:

rotatable interrupter means having regularly spaced, alternating reflective and nonreflective areas around its periphery;

means for turning the rotatable interrupter means at a rate that is a function of the angular velocity of the wheel;

stationary interrupter means, spaced from and adjacent to the rotatable interrupter means, and having regularly spaced, alternating reflective and light transmissible areas around its periphery;

a light source located remotely from the rotatable and stationary interrupter means;

an optical fiber for transmitting light from the light source to the stationary interrupter means, and for receiving light reflected by the rotatable and stationary interrupter means, wherein the reflective areas of the stationary interrupter means reflect a bias level of light, and the reflective areas of the rotatable interrupter means reflect light passing through the transmissible areas of the stationary interrupter means, so that, when the rotatable interrupter means is turned, the amount of light received by the optical fiber will be modulated above the bias level and at a rate proportional to the angular velocity of the wheel; and means, located remotely from the stationary and rotatable interrupter means, for converting the modulated light rate to an electrical signal proportional to the rotational speed of the wheel.

9. The invention of claim 8 further comprising means, located remotely from the rotatable and stationary interrupter means, for detecting the absence of the constant bias level of light.

10. The invention of claim 8 wherein only one optical fiber transmits light from the light source and receives reflected light from the rotatable and stationary interrupter means.

11. The invention of claim 8 further comprising a graded index collimating lens between the stationary means and the optical fiber, wherein the lens collimates the light transmitted by the optical fiber, and the light reflected by the rotatable and stationary interrupter means and received by the optical fiber.

12. A reflective optical transducer system for measuring the rotational speed of a wheel in an aircraft skid control system comprising:

a rotatable disc having regularly spaced, alternating reflective and nonreflective areas around its periphery;

means for turning the rotatable disc at a rate that is a function of the angular velocity of the wheel;

a stationary disc, spaced from and coaxial with the rotatable disc, and having regularly spaced, alternating reflective and light transmissible areas around its periphery;

a constant intensity light source located remotely from the discs;

a single optical fiber for transmitting light from the light source to the stationary disc, and for receiving light reflected by the rotatable and stationary discs, wherein the reflective areas of the stationary disc reflect a bias level of light, and the reflective areas of the rotatable disc reflect the light passing through the transmissible areas of the stationary disc, so that, when the rotatable disc is turned, the amount of light received by the optical fiber will be modulated above the bias level and at a rate proportional to the angular velocity of the wheel;

a graded index collimating lens located between the stationary disc and the optical fiber, wherein the lens collimates the light transmitted by the optical fiber, and the light reflected by the discs and received by the optical fiber; means, located remotely from the discs, for converting the modulated light rate to an electrical signal proportional to the rotational speed of the wheel; and means, located remotely from the discs, for detecting the absence of the constant bias level of light.

13. The invention of claim 12 further comprising means for positioning the end of the optical fiber in near contact with and concentric to the optical axis of the lens.

14. The invention of claim 13 wherein the positioning means includes a connector receptacle in the transducer, a lens holder which fits snugly within the connector receptacle, and an optical fiber connector which fits tightly within the connector receptacle.

15. The invention of claim 12 further comprising beam splitting means adjacent the remote end of the optical fiber, the light source, the converting means, and the detecting means, wherein the beam splitting means allows one end of the optical fiber to transmit light from the light source to the discs, and to transmit reflected light from the discs to the converting means and the detecting means.

16. A reflective optical transducer system for measuring the rotational speed of a wheel comprising:

first and second interrupter means having alternating reflective and nonreflective areas around their peripheries, and spaced apart and adjacent to each other;

means for rotating one of the interrupter means at a rate that is a function of the angular velocity of the wheel;

a light source located remotely from the first and second interrupter means;

optical fiber means for transmitting light from the light source to the first interrupter means, and for receiving light reflected by the first and second interrupter means, wherein the reflective areas of the first interrupter means reflect a bias level of light, and the reflective areas of the second interrupter means reflect light passing through the nonreflective areas of the first interrupter means, so that as one of the interrupter means is rotated the amount of light received by the optical fiber means will be modulated above the bias level and at a rate proportional to the angular velocity of the wheel; and means, located remotely from the first and second interrupter means, for converting the modulated light rate to a signal representing the rotational speed of the wheel.

17. The invention of claim 16 wherein the first interrupter means is stationary and the second interrupter means is rotated.

18. The invention of claim 16 wherein only one optical fiber transmits light from the light source and receives reflected light from the first and second interrupter means.

19. The invention of claim 16 further comprising a graded index collimating lens means between the first interrupter means and the optical fiber means, wherein the lens means collimates the light transmitted by the optical fiber means, and the light reflected by the first and second interrupter means and received by the optical fiber means.

20. The invention of claim 16 further comprising means, located remotely from the rotatable and stationary interrupter means, for detecting the presence or absence of the constant bias level of light.

21. A reflectivel optical transducer system for measuring the rotational speed of a wheel comprising:

first and second interrupter means having alternating reflective and nonreflective areas around their peripheries, and spaced apart and adjacent to each other;

means for turning one of the interrupter means at a rate that is a function of the angular velocity of the wheel;

a light source located remotely from the first and second interrupter means;

optical fiber means for transmitting light from the light source to the first interrupter means, and for receiving light reflected by the first and second interrupter means, wherein the reflective areas of the first interrupter means reflect a bias level of light, and the reflective areas of the second interrupter means reflect light passing through the nonreflective areas of the first interrupter means, so that as one of the interrupter means is turned, the amount of light received by the optical fiber means will be modulated above the bias level and at a rate proportional to the angular velocity of the wheel;

means, located remotely from the first and second interrupter means, for converting the modulated light rate to a signal representing to the rotational speed of the wheel; and means, located remotely from the first and second interrupter means, for detecting the presence or absence of the constant bias level of light.

22. The invention of claim 21 wherein only one optical fiber transmits light from the light source and receives reflected light from the first and second interrupter means.

23. The invention of claim 21 wherein the first interrupter means is stationary and the second interrupter means is turned.

* * * * *